United States Patent
Richardson

(10) Patent No.: US 6,502,961 B1
(45) Date of Patent: *Jan. 7, 2003

(54) CONICAL LENS ARRAY TO CONTROL PROJECTED LIGHT BEAM COLOR, DIVERGENCE, AND SHAPE

(76) Inventor: Brian Edward Richardson, 18675-K Adams Ct., Morgan Hill, CA (US) 95037

( * ) Notice: Subject to any disclaimer, the term of this patent is extended or adjusted under 35 U.S.C. 154(b) by 0 days.

This patent is subject to a terminal disclaimer.

(21) Appl. No.: 09/717,492

(22) Filed: Nov. 20, 2000

(51) Int. Cl.7 .............................................. F21V 29/00
(52) U.S. Cl. ...................... 362/268; 362/280; 362/323; 362/332; 362/331; 362/339
(58) Field of Search ................................ 362/268, 280, 362/281, 282, 323, 331, 332, 339, 293; 359/813, 814

(56) References Cited

U.S. PATENT DOCUMENTS

| | | | | |
|---|---|---|---|---|
| 3,702,929 A | * | 11/1972 | Burch ......................... 362/268 |
| 5,775,799 A | * | 7/1998 | Forkner ....................... 362/268 |
| 5,918,968 A | * | 7/1999 | Choi ........................... 362/268 |
| 6,048,081 A | * | 4/2000 | Richardson .................. 362/307 |
| 6,142,652 A | * | 11/2000 | Richardson .................. 362/280 |
| 6,246,526 B1 | * | 6/2001 | Okuyama .................... 359/621 |

* cited by examiner

Primary Examiner—Sandra O'Shea
Assistant Examiner—Ronald E. DelGizzi
(74) Attorney, Agent, or Firm—The Kline Law Firm

(57) ABSTRACT

A lighting module that modifies a light beam to affect the size and shape and color characteristics of the projected beam includes a light source and a reflector to direct the light along an optic path. The reflector is formed so that light is directed along a light path that is not parallel to a center line of the reflector. A primary lens element reduces the cross section of an effected light region as the light enters a modifying element area in the optic path. Light modifying elements are deployed in varying combinations and to varying degrees to produce the shape, size, and color of light beam desired by the user. The construction of the light modifying elements allows the elements to be physically positioned in the optic path but to have no effect on the light until the elements are rotated so that light modifying element segments align with lens segments of the primary optical element, and the light modifying element or elements change the light being projected from the lighting module.

18 Claims, 19 Drawing Sheets

CONICAL LENS ARRAY TO CONTROL PROJECTED LIGHT BEAM COLOR, DIVERGENCE, AND SHAPE

BACKGROUND OF THE INVENTION

1. Field of the Invention

This invention relates generally to entertainment and architectural lighting, and more specifically is a device utilizing a conical lens array to control the divergence and/or shape of a beam of light, and the hue, saturation, and brightness of color of the beam of light emanating from a lighting module.

2. Description of the Prior Art

Lighting modules are often used in the theater, television, touring productions, and architectural applications. The divergence and shape of a light beam, as well as the hue, saturation, and intensity of the color of the light emitted, may be varied according to the wishes of the user to obtain a particular artistic effect. The artistic requirements might be that the emitted light beam remain static, or that it change over time. Cost, speed of changing effects, the quantity of effects produced, the smoothness of transition, compact size and weight, and the efficiency of transmitting light are all factors in the practical usage of a lighting module system.

The prior art most relevant to the present invention is disclosed in Applicant's prior U.S. Pat. No. 6,048,081, issued Apr. 11, 2000, U.S. Pat. No. 6,142,652, issued Nov. 7, 2000. The above referenced patents are incorporated by reference herein in their entirety. The '081 patent discloses a device that diffuses a light beam to control the divergence and/or shape of a beam of light emanating from a lighting module. The '081 device, see FIGS. 1 and 2, includes a light source 10 and a reflector 12 to direct the light along an optic path. A primary lens element 16 reduces the cross section of an effected light region as the light enters a diffusion assembly area 30 in the optic path. Diffusion elements 1801 in the diffusion assembly 18 are deployed in varying combinations and to varying degrees to produce the shape and size of light beam desired by the user. The action of the lens segments 161 allows the diffusion elements to be physically positioned in the optic path but to have no effect on the light until the diffusion elements are rotated so that diffusion element segments align with lens segments, and the diffusion element then changes the light being projected from the lighting module.

Similarly, the '652 patent discloses a device to control the hue, saturation, and brightness of color emanating from a lighting module. The '652 device, see FIGS. 3 and 4, also includes a light source 10 and a reflector 12 to direct the light along an optic path. A primary lens element 16 reduces the cross section of effected light regions as the light enters a filter assembly area 30 in the optic path. Filters 181' in the filter assembly 18' are deployed in varying combinations and to varying degrees to produce the color, hue, and intensity of light desired by the user. As with the '081 device, the refracting action of the '652 lens segments allows the filters to be physically positioned in the optic path but to have no effect on the light until the filters are rotated so that filter element segments align with lens segments, and the filters then change the light being projected from the lighting module.

In working with and developing the prior art systems disclosed above, the inventor has discovered some shortcomings in the prior art. In particular, it has been determined that it is inefficient to treat the light from the light source as though all the light rays are parallel to the center line of the source. Moreover, it has been discovered that placement of the light modifying elements midway between the primary optical element and the secondary optical element also generates some inefficiency in the system.

Accordingly, it is an object of the present invention to provide a light projection module that utilizes light from a source projected at an angle not parallel to a center line of the light path.

It is a further object of the present invention to modify the placement of the light modifying element or elements between the primary optical element and the secondary optical element.

SUMMARY OF THE INVENTION

The present invention is a lighting module that modifies a light beam to affect the size and shape and color characteristics of the projected beam. The device includes a light source and a reflector to direct the light along an optic path. The reflector is formed so that light is directed along a light path that is not parallel to a center line of the reflector. A primary lens element reduces the cross section of an effected light region as the light enters a modifying element area in the optic path. Light modifying elements are deployed in varying combinations and to varying degrees to produce the shape, size, and color of light beam desired by the user. The construction of the light modifying elements allows the elements to be physically positioned in the optic path but to have no effect on the light until the elements are rotated so that light modifying element segments align with lens segments of the primary optical element, and the light modifying element or elements change the light being projected from the lighting module.

An advantage of the present invention is that it provides a single, compact unit that allows the user to project various sizes and shapes of light beams. This eliminates the need for multiple pieces of equipment.

Another advantage of the present invention is that it is simple and inexpensive to manufacture and is therefore reliable and easy to maintain.

Still another advantage of the present invention is that the lens segments allow the diffusion elements to be installed in the optic path, the diffusion elements having no effect when in a non-deployed position.

A further advantage of the present invention is that the use of an angled light reflector increases the efficiency of the system.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 6:
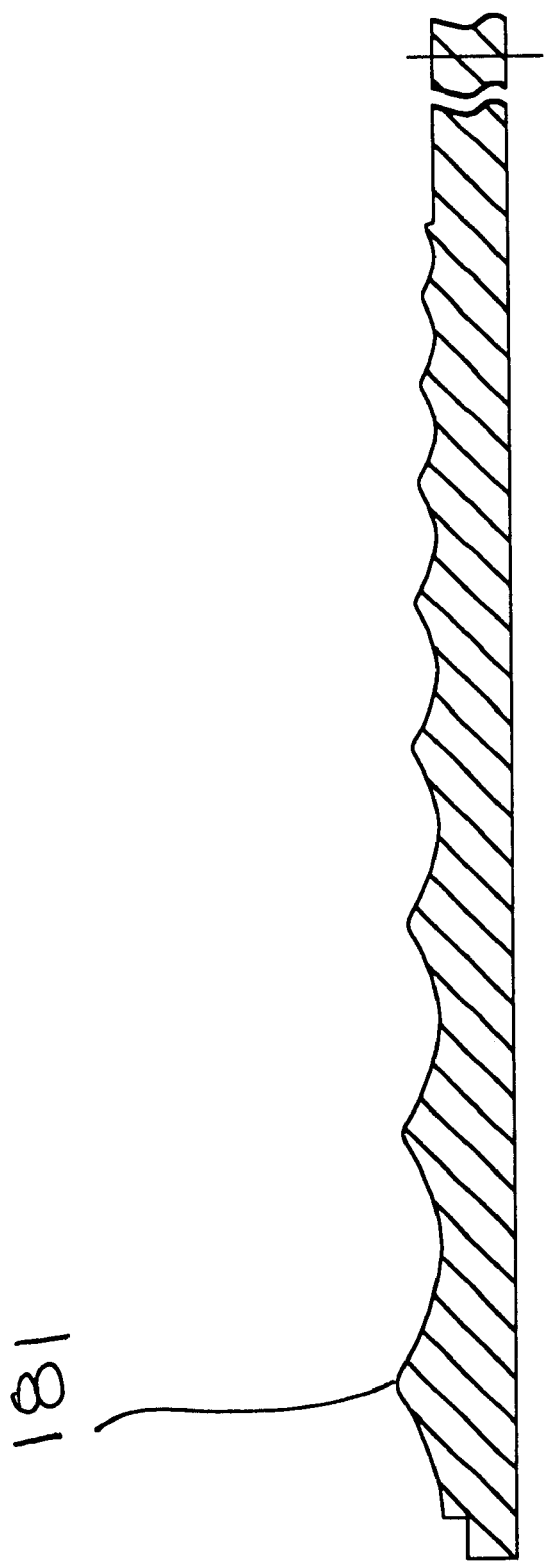
FIG. 6 is a top view of a lighting module with a conical lens array according to the present invention.
Figure 7:
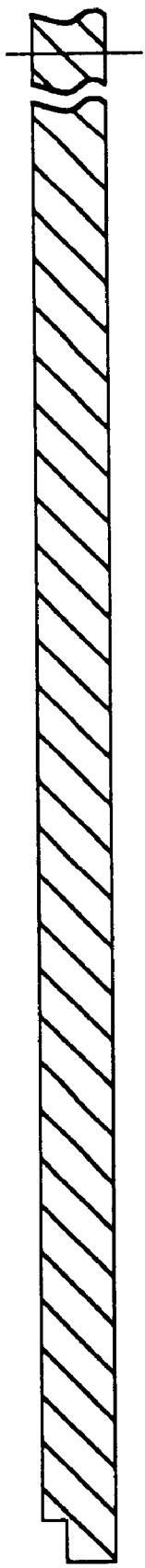
FIG. 7 is a top sectional view of a lighting module with a conical lens array according to the present invention.

The present invention is a light beam module that uses a conical lens array to control the divergence, shape, and color—including hue, saturation, and brightness of color—of light emanating from a lighting module. The basic conformation of the light controlling module used in conjunction with a light source is illustrated in FIGS. 5–7.

Figure 1:
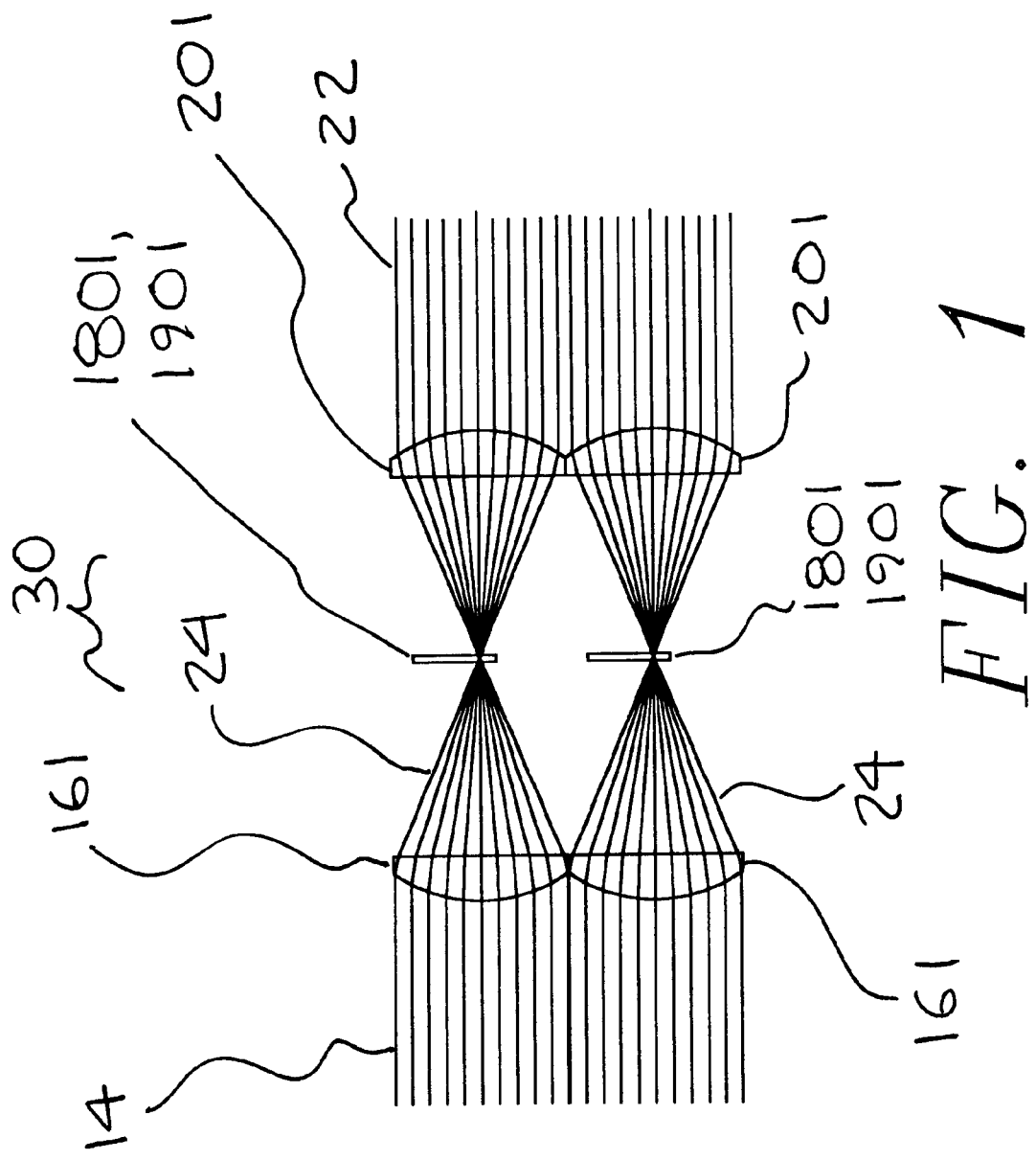
FIG. 1 shows a prior art light beam shaping system.
Figure 2:
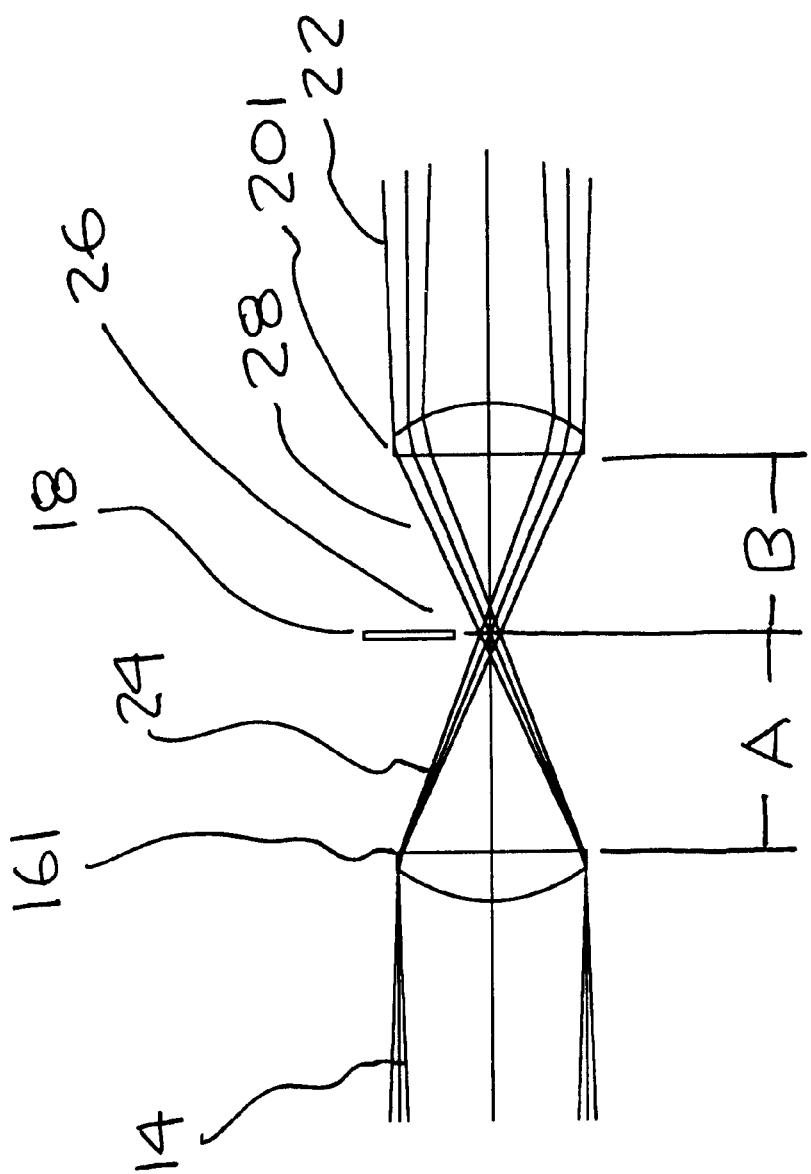
FIG. 2 shows the effect of the prior art system of FIG. 1 on the transmitted light.
Figure 3:
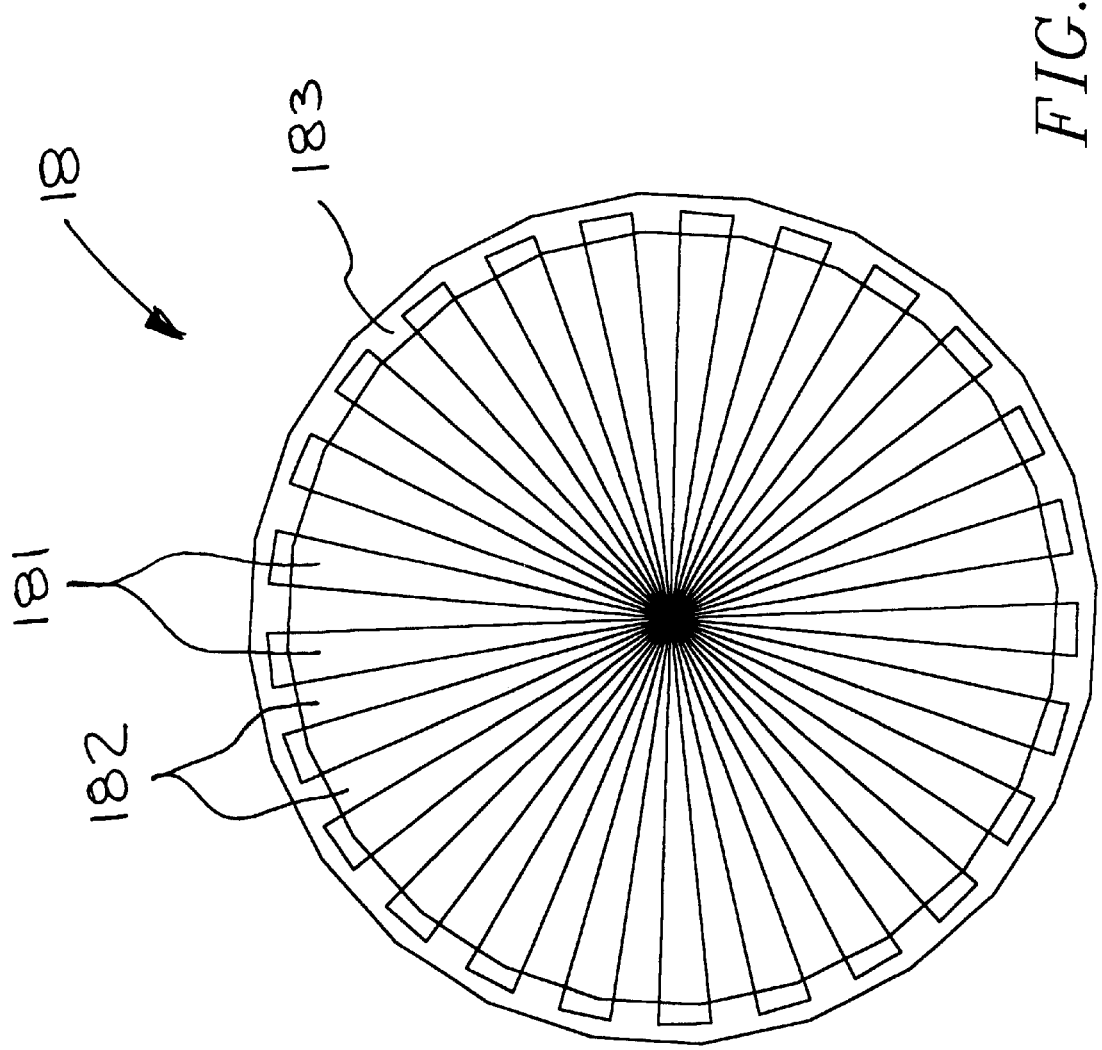
FIG. 3 shows a prior art color filter system.
Figure 4:
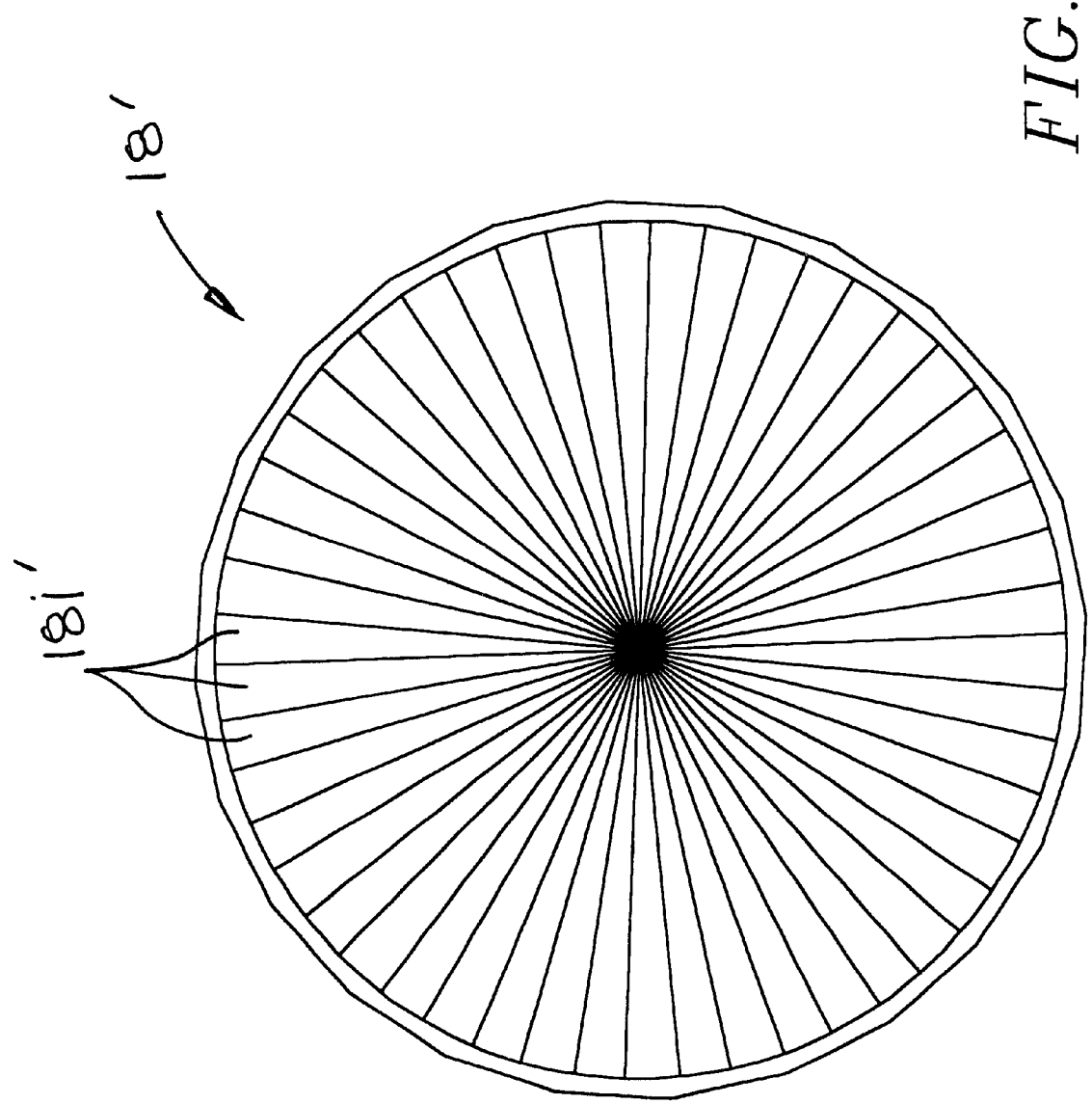
FIG. 4 shows the effect of the prior art system of FIG. 3 on the transmitted light.
Figure 5:
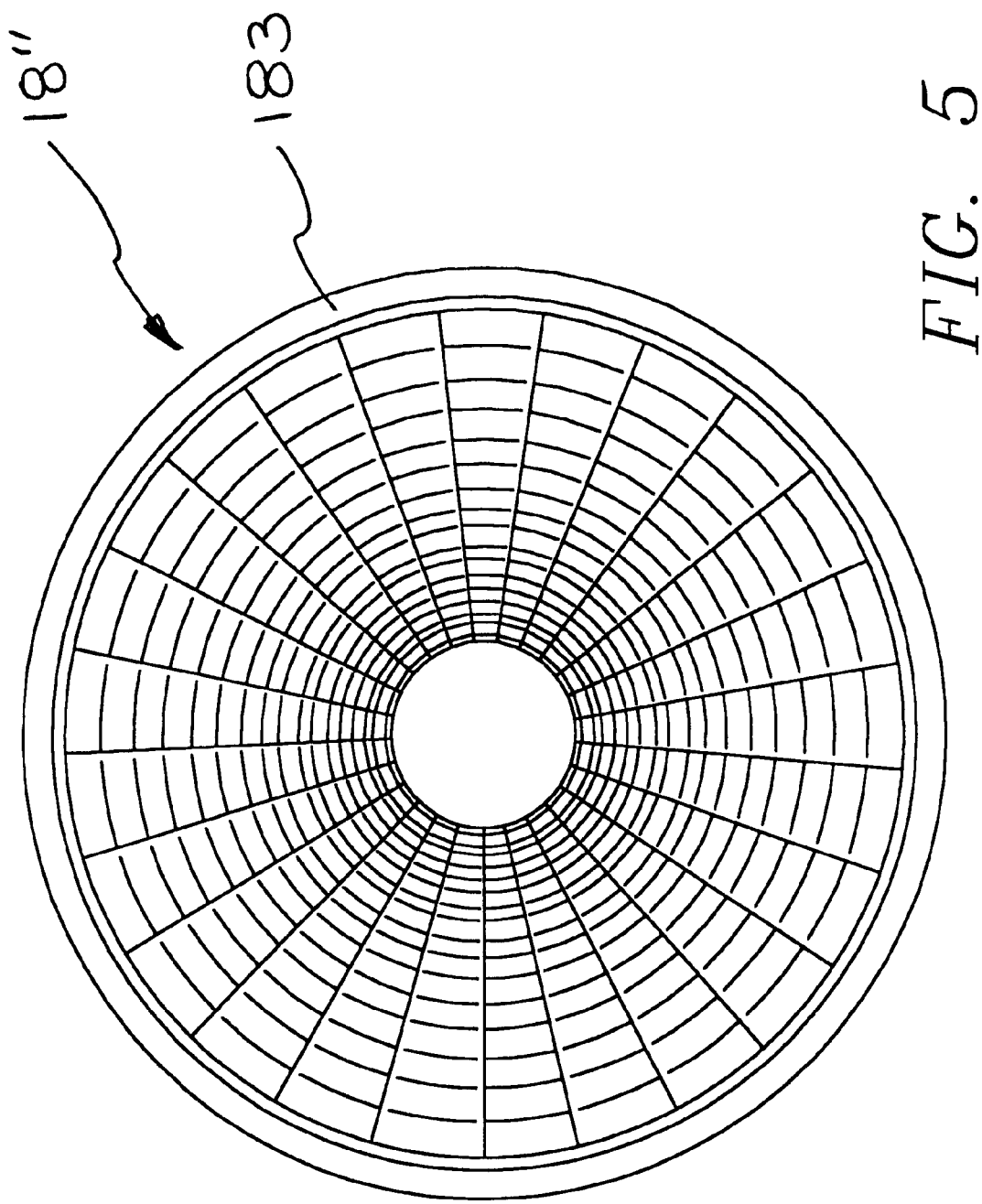
FIG. 5 is a perspective view of a lighting module with a conical lens array according to the present invention.

Referring first to FIG. 5, a light source 10 is shown for reference in describing the operation of the system. The light source 10 may be nearly any type or size light source —arc or incandescent or a light source with a condenser lens. These light sources are well known to those skilled in the art.

The light source 10 is typically located within an optical element that redirects light from the light, a reflector 12. The reflector 12, as is the case with the light source 10, may be of any common type or size. A modified parabolic reflector is depicted in the drawings. However, one of the key differences of the present invention as compared to the prior art is that the reflector 12 is set up so that the light paths of inbound light rays 14 leaving the reflector 12 are not parallel to a center line of the reflector, but rather are deflected inward (see FIGS. 6, 6A, and 7). In the module of the present invention, the optical path also includes a primary optical element 16, at least one light modifying element 18, and a secondary optical element 20. The light rays exit the secondary optical element 20 as outbound light rays 22.

The inbound light rays 14 emanate from the reflector 12 in substantially parallel paths. However, in the present invention the light rays are not directed along paths parallel to the center of the reflector 12, but rather are angled inward at an angle α. In the preferred embodiment, α is an angle of 5°. The angling of the light paths causes a larger percentage of the light from the light source 10 to pass through the primary optical element 16. Optical elements 16 and 20 bend light as a result of their conical shape, therefore light exiting the module becomes again generally parallel, and is directed along a path parallel to the centerline of the device.

Figure 6A:
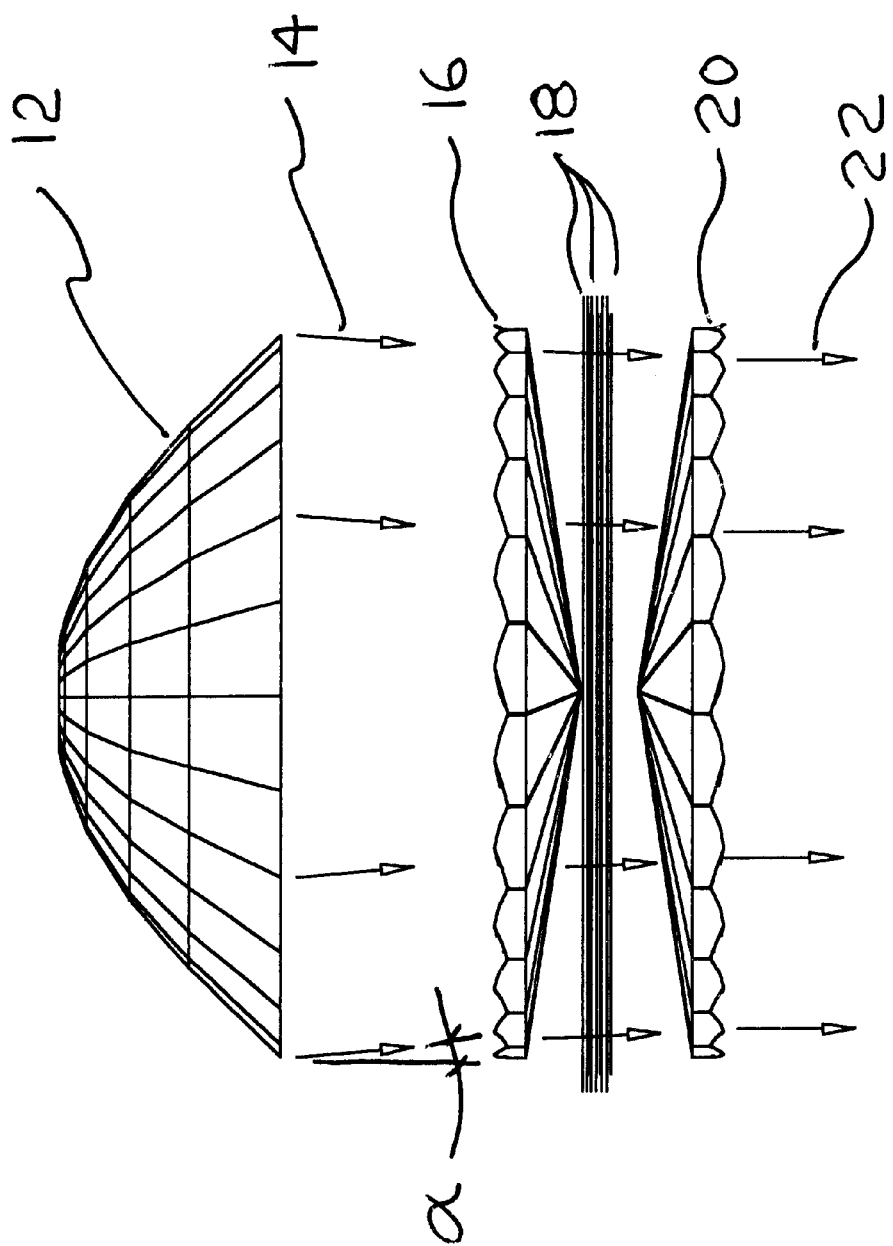
FIG. 6A is a top view of a lighting module with a conical lens array according to the present invention and with a plurality of light modifying elements.

As can best be seen in FIGS. 6, 6A, and 7, the optical elements 16 and 20 are conical lens arrays. That is, sections of the optical elements 16 and 20 are not cylinders, but rather the arrays are conical in profile, angling upward from a center point of the optical elements 16 and 20 at an angle β. In the preferred embodiment, the angle β is approximately 12°.

The angling of the optical elements 16 and 20 ensures that the maximum refractive angle of light emanating from elements 16 and 20 is constant across the radius of the element. With the cylindrical optical elements of the prior art, the maximum refractive angle varies from an outer radius to an inner radius. Light contacting the conical lens array of the optical elements 16 and 20 of the present invention at an outer radius is subject to the same maximum refractive angle as light contacting the optical element at a middle or an inner radius. This refractive angle, y, is approximately 30° and can be seen clearly in FIG. 9.

Figure 8:
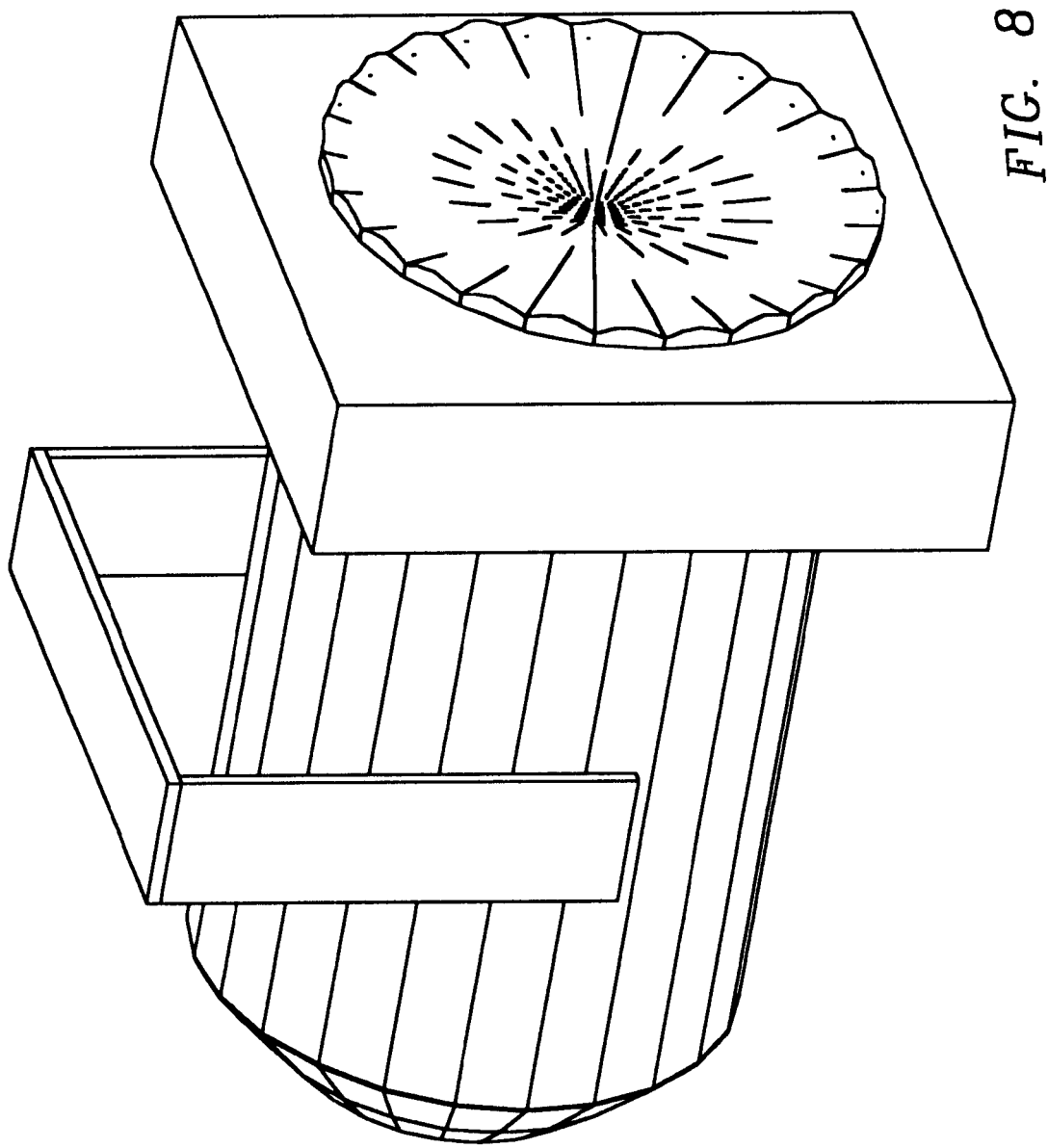
FIG. 8 is a front view of a conical lens array according to the present invention.

FIG. 8 is a front view of the secondary optical element 20 as viewed in its position along the optical path longitudinal axis. In the preferred embodiment of the present invention, the secondary optical element 20 is comprised of twenty-five identical lens segments 201. The lens segments 201 are wedge shaped, and are positioned adjacent to one another radially around a center point 202 of the secondary optical element 20. A focal line 203 of each lens segment 201 optimally originates at the center 202 of the optical element 20, and emanates outward along a longitudinal center of the lens 201. The secondary optical element 20 is preferably a unitary element formed from a solid piece of material, typically by a molding process.

While the number of elements 201, and indeed the shape of the segments 201, is not critical to the operation of the device, it is preferable to have an odd number of lens segments 201. It has been found in practice that an odd number of segments produce a more even field of projected light rays 22. This is more apparent when the projected light falls onto a surface such as a wall or a stage. This is the result of light from region 204 of the optical element 20 diverging slightly in inward and outward directions. With a size element engaged the divergence can be significant. Half of this light diverges in the outward direction and the remaining light diverges in the inward direction. The inward light, as it travels away from the optical element 20, eventually crosses the center and becomes outward projecting on the opposite side. If, as shown, there are an odd number of segments, this light fills the area not filled by the projected light from 205 and 206. This filling is accomplished with all segments and in all directions, and results in a more even field of projected light.

Figure 9:
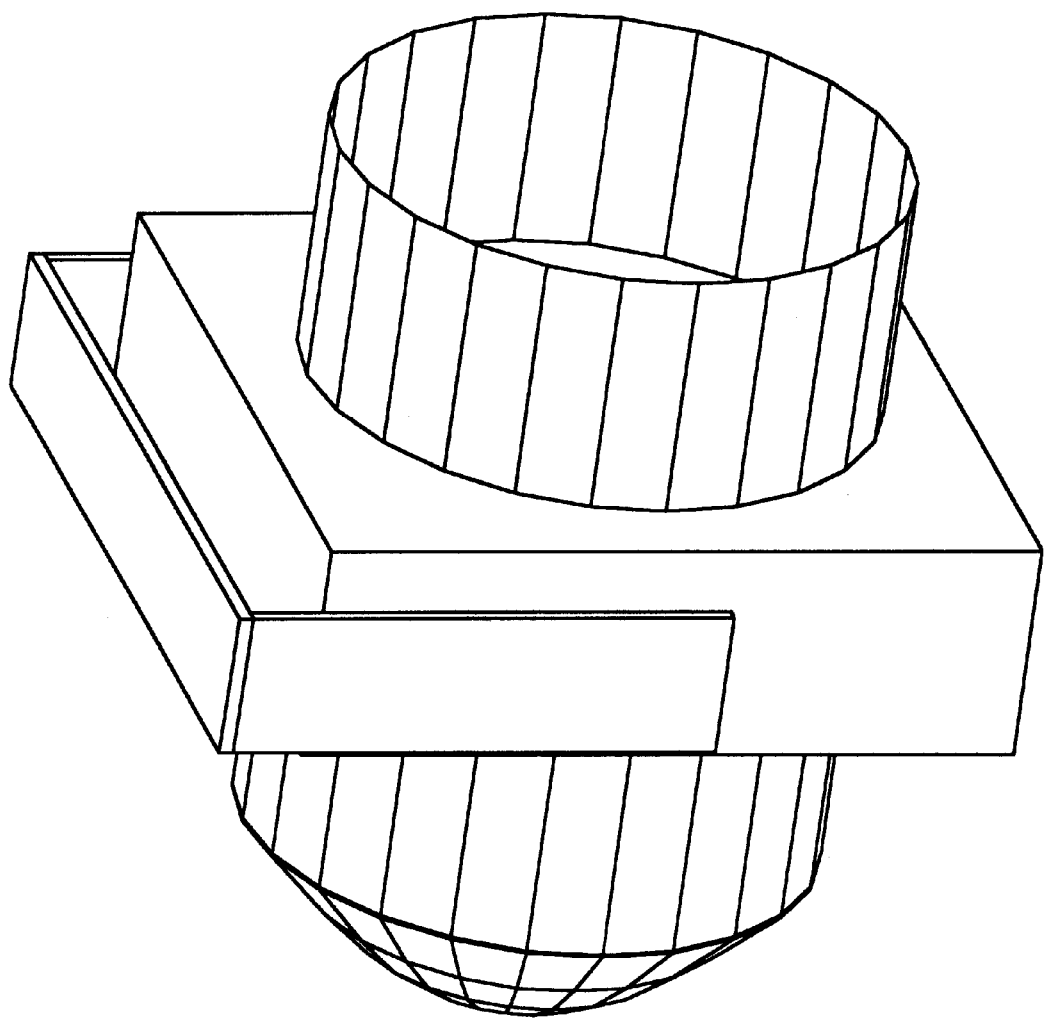
FIG. 9 shows a segment of the optical ray trace of the system with the light modifying element not introduced into the optical path.
Figure 10:
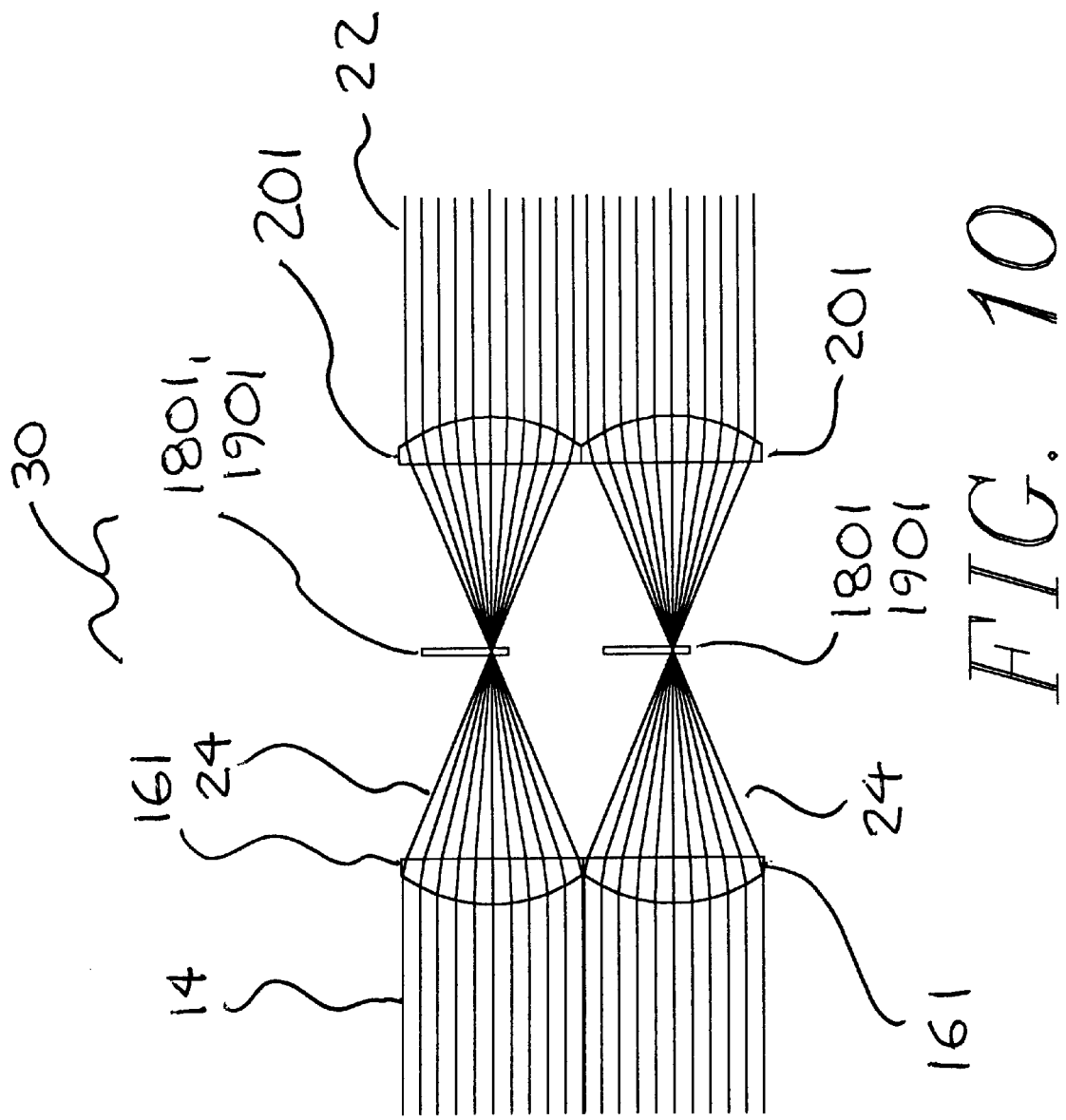
FIG. 10 shows a segment of the optical ray trace of the system with the light modifying element partially deployed in the optical path.

FIGS. 9 and 10 are ray traces that show a side view of a pair of typical lens segments 161. FIG. 9 shows the module with the light modifying element 18 not to introduced into the optical path, and FIG. 10 shows the situation with the light modifying element 18 introduced into the optical path. Inbound light rays 14 enter from the left and strike the lens 161. Refracted light rays 24 exit each lens 161 and converge at a focal point 26. All the focal points 26 lie on the corresponding focal lines 163 of the lens segments 161. The light rays then become divergent light rays 28 as they exit the focal point 26 and strike a lens segment 201 of the secondary optical element 20. Outbound light rays 22 are then again generally parallel. FIG. 9 is drawn with the assumption that all the inbound light rays 14 are parallel.

Figure 11:
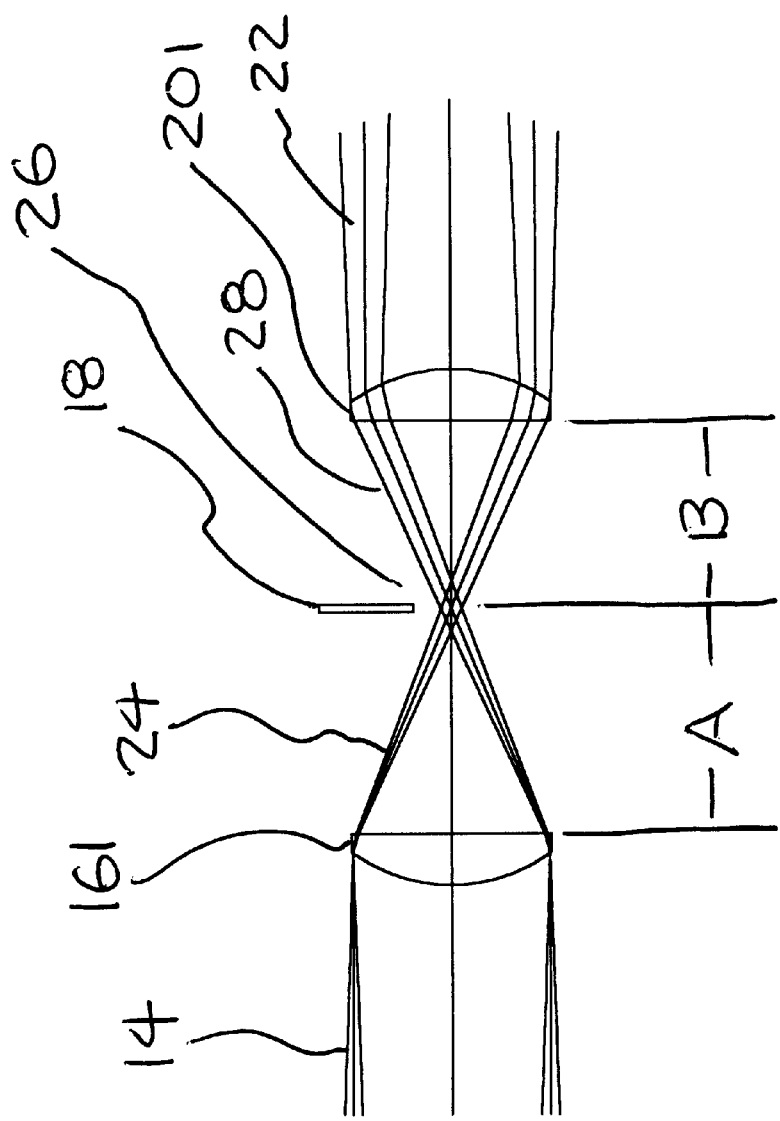
FIG. 11 shows a segment of the optical ray trace of the system with the light modifying element moved off center to compensate for non-parallel light rays.

However, as FIG. 11 depicts, the inbound light rays 14 are not all parallel. Therefore, to achieve the optimal effect, the focal point must be positioned off center between the primary optical element 16 and the secondary optical element 20. To capture the maximum percentage of refracted light rays 26 on the light modifying element 18, length A must be greater than length B.

The secondary optical element 20 has a slightly different focal length as compared to the primary optical element 16. The difference in focal lengths is determined by the specific application of the light module. If a user did not require generally parallel light, he could eliminate the secondary optical element altogether, which would result in a more diffuse light beam.

The outbound light rays 22 emanate from the secondary lens segments 201, again with paths essentially parallel to their original direction. The type of optical elements shown herein are of the simple non-symmetric biconvex type, but many other types may be employed to obtain the desired results. A person knowledgeable in the art of optics could devise an endless number of optical elements to obtain the desired result of a reduction of the cross section and/or redirection of the light rays.

Figure 12:
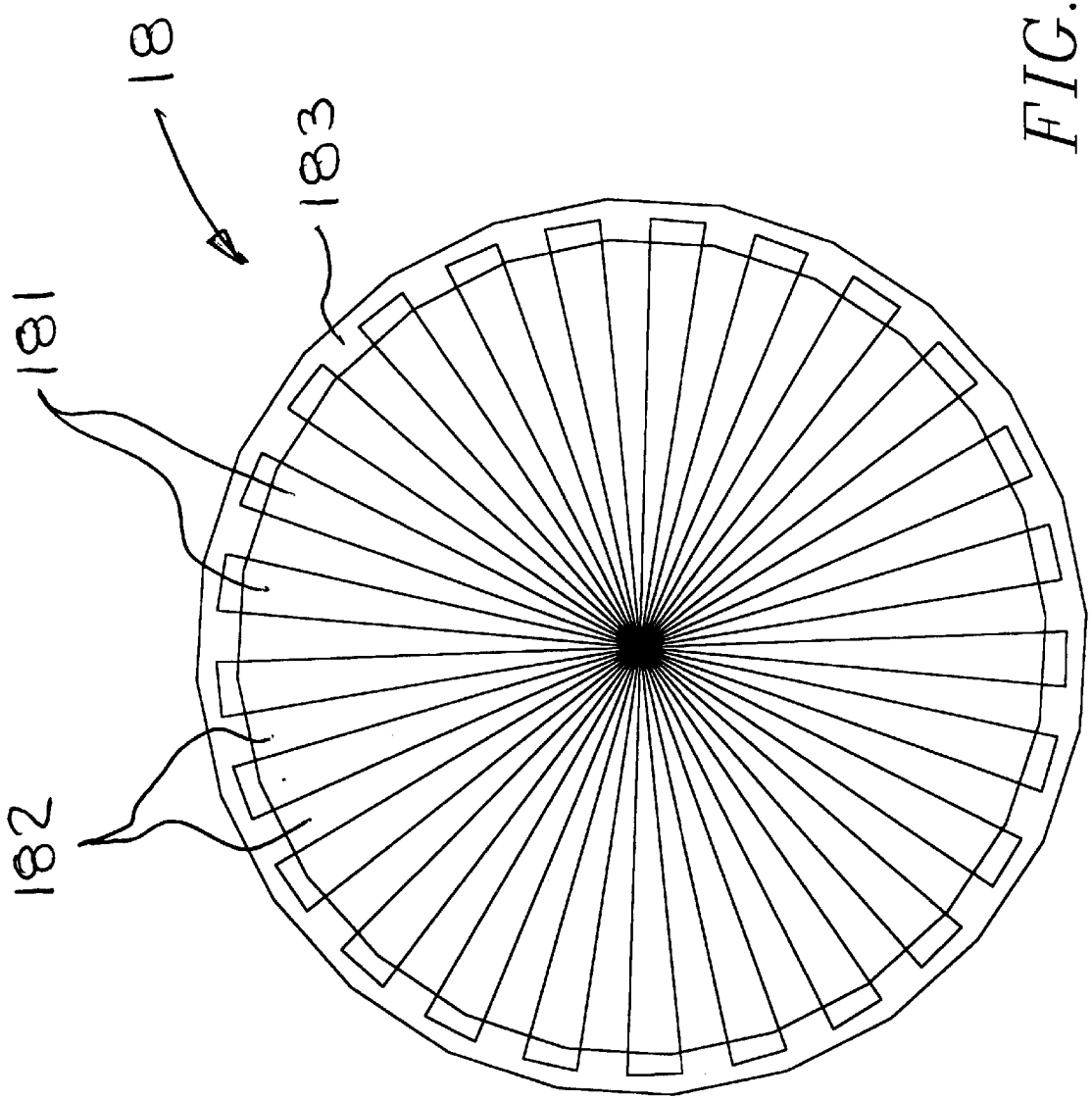
FIG. 12 is a detail view of a light modifying element as viewed along the optical path.

A first example of a light modifying element 18 is shown in FIG. 12. The light modifying element 18 comprises a plurality of active regions 181 and a plurality of passive regions 182. In the element shown in FIG. 12, the passive regions 182 are open spaces. The active regions are independent segments that are affixed to a peripheral frame 183. The light modifying element 18 can be constructed to affect either the size or shape of the projected beam, or the color characteristics—including hue, saturation, and brightness—of the projected beam.

Figure 13:
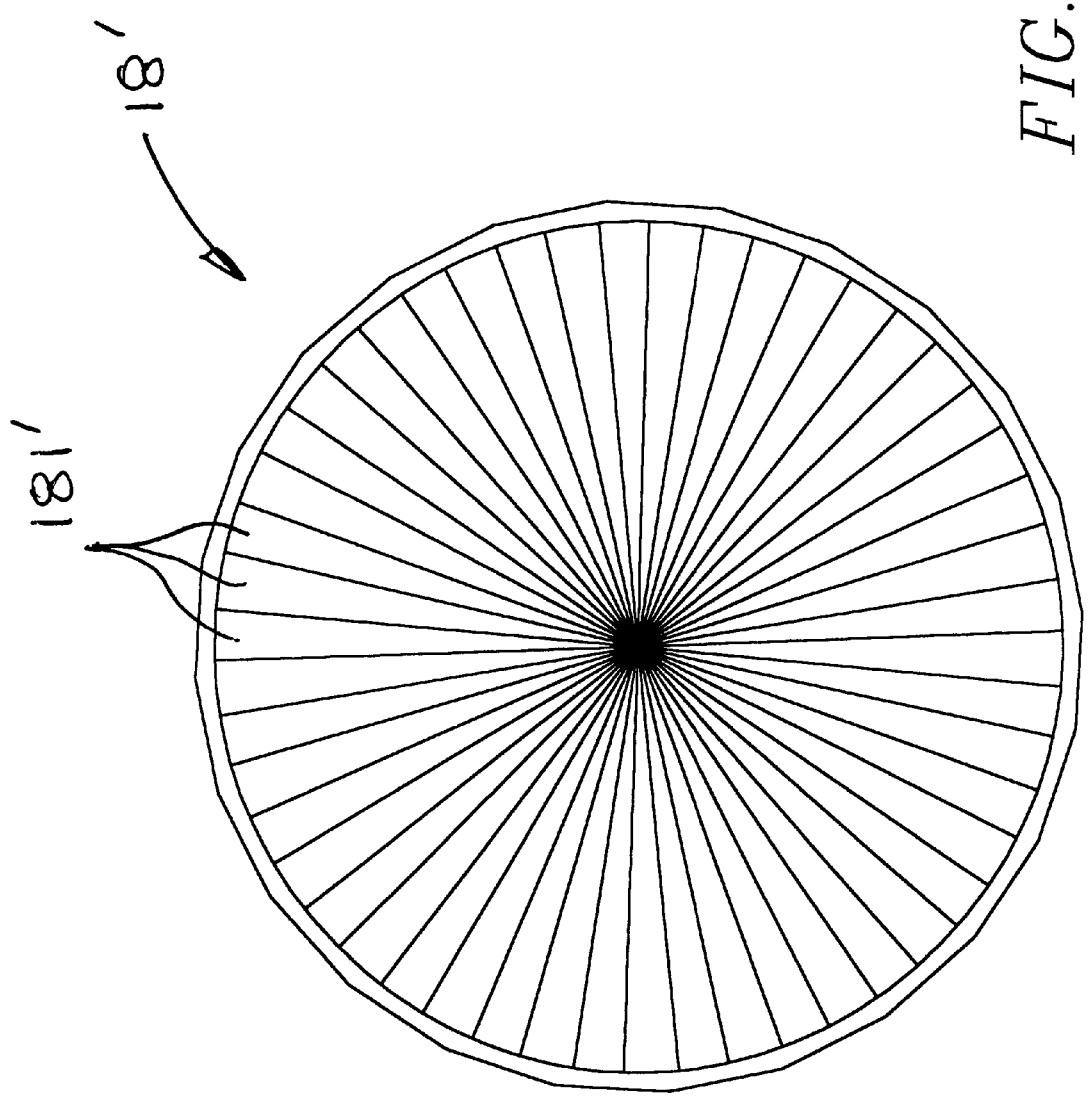
FIG. 13 is a detail view of an alternate light modifying element viewed along the optical path.

It has been found in practice of the invention that machining the light modifying element 18 with open spaces as shown in FIG. 12 is problematic. Accordingly, an alternate construction for a light modifying element 18' is shown in FIG. 13. The light modifying element 18" is a single piece of material mounted in a frame 183. The active regions 181' are equivalent to those of the element 18, and affect the light in a way chosen by the user during construction of the element 18'. The passive regions 182' are formed by coating the material in those areas in an element that is not coated, or by removing coating in those areas of a coated element.

Figure 14:
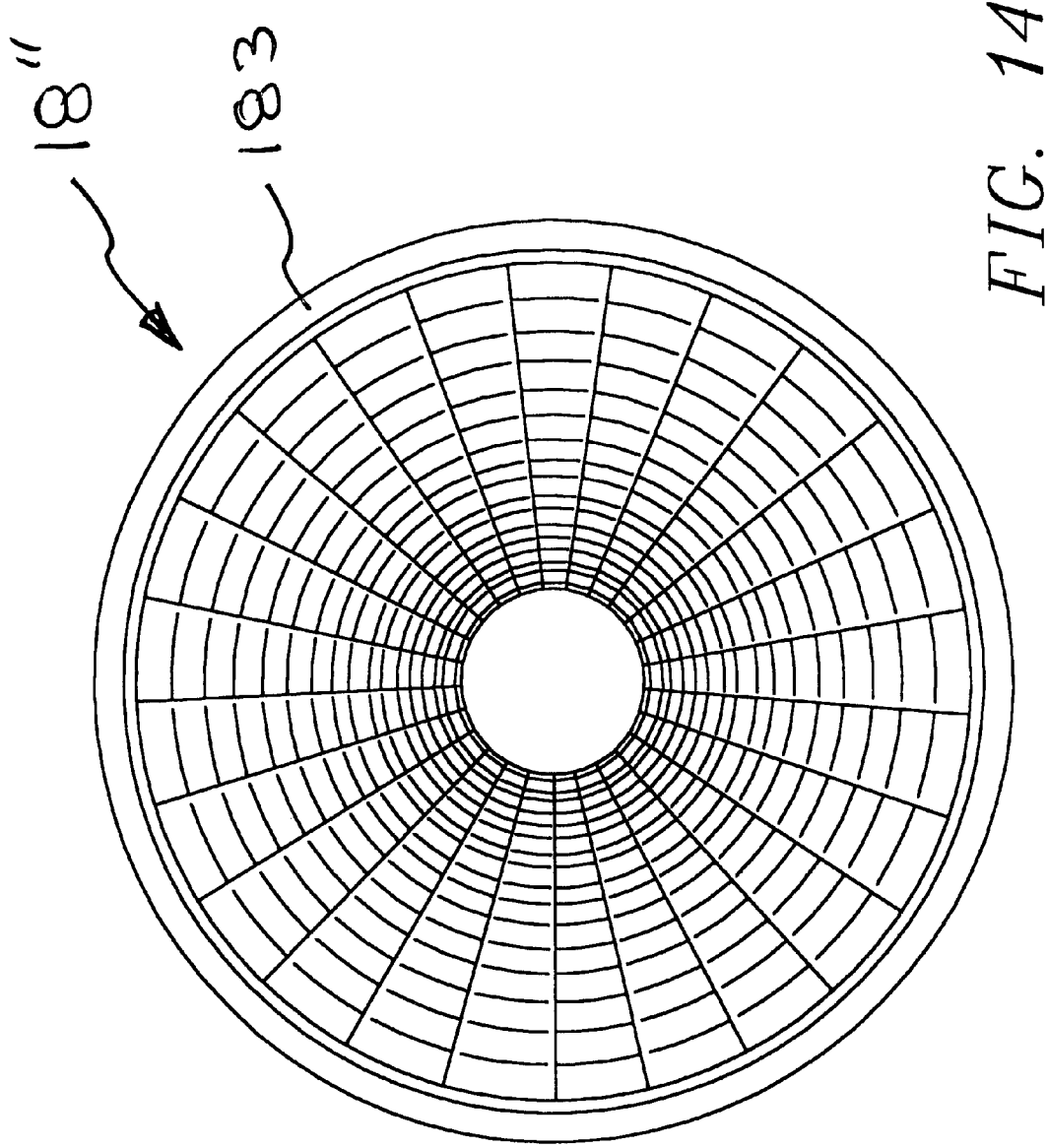
FIG. 14 is a detail view of a light modifying element adapted to control the size of the projected beam.
Figure 15:
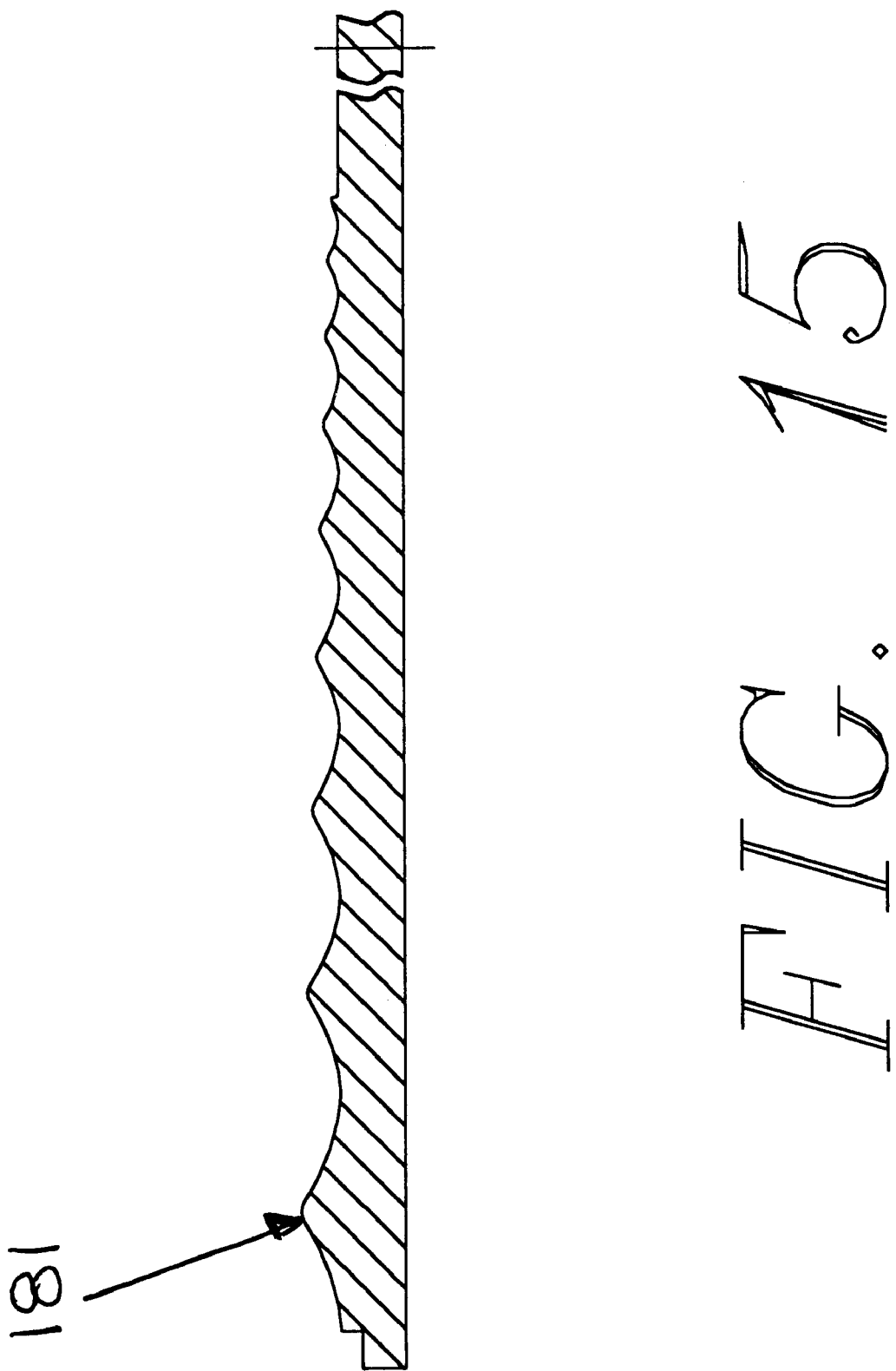
FIG. 15 is a sectional view of a light modifying element that would be used to produce a wide projected beam.
Figure 16:
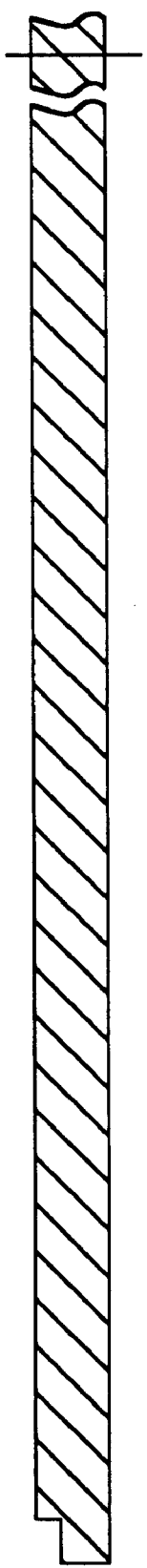
FIG. 16 is a sectional view of a light modifying element that would be used to produce a narrow projected beam.

FIG. 14 illustrate the structure of a size controlling light modifying element 18". This element is a single piece of glass, and features a radial scalloping pattern as shown in FIGS. 15 and 16. The height of the scallops determines the degree to which the projected light is spread. Many relatively tall scallops lead to a wide projected beam (the situation depicted in FIG. 15), while a flat profile (FIG. 16) yields a small projected beam. The tallest portion of the scallop is where the spreading of the light is greatest, and the lowest portion of the scallop is where the spreading of the light is the least.

All the optical components of the present invention are depicted in the drawings as radial arrays, but could just as easily be constructed as linear or matrix arrays. If the arrays are linear or matrix, deployment of the light modifying elements is by linear motion, as opposed to the rotational motion used by the radial arrays.

Referring again to FIGS. 5–11, the light modifying elements are centered around the optic path. It should be noted that any number of light modifying elements can be used in combination. The light modifying elements are oriented perpendicular to the longitudinal axis of the optic path. When in the non-deployed position, the light modifying elements are not in the path of the refracted light rays as the refracted light rays exit the primary optical element 16 and are reduced to focal points by the lens segments 161.

The centers of the light modifying elements used and all the optical elements employed are coaxial. The line containing those centers defines the center line of the optic path in the device. The frames of the light modifying elements are constrained to rotate about the center line of the optic path. Any number of methods can be chosen to constrain the light modifying elements to this type of motion. Rotational movement of any of the light modifying elements about the optical axis results in the active segments of the light modifying elements being introduced into the light path, and therefore affecting the characteristics of the projected light.

The light modifying elements can be fabricated by any one of many means known to those skilled in the art to obtain equivalent results in the device. The light modifying element may for some applications be of constant effect over its entire surface.

When the light modifying elements 18, 18', and 18" are in a non-deployed position, the center lines of the light modifying element segments 181, 181', and 181" are aligned between the focal lines of the primary optical element 16. When the light modifying elements 18, 18', and 18" are to be deployed, the elements are rotated so that the light modifying element segments 181, 181', and 181" begin to intersect the refracted or reflected light rays from the lens segments of the primary optical element 16.

In FIG. 10, the light modifying element 18 has been rotated about the system centerline so that a segment of the element begins to impinge on the light region. In all the embodiments of the present invention, the light modifying element 18 is placed in the optic path in an area where the primary optical element 16 has reduced the cross sections of the light regions. Thus the rotation of one of the light modifying elements 18 causes the light modifying element to affect the light. If more effect from the light modifying element is desired, the light modifying element is rotated further so that the light modifying element segments 181 are completely in the light path. All the light modifying elements 181 in the light modifying element assembly 18 are deployed in this manner. Again, the lens or reflective segments of the primary optical elements breaking the light into multiple regions of reduced cross section is what allows this unique deployment of the light modifying elements 181. The light modifying elements 181 are invisible to the light until the light modifying elements 181 are rotated within the light path. The degree of modification of the light is therefore related to the degree of movement of the light modifying element.

The movement of the light modifying elements 18 into and out of the reduced area of the light path can be done manually, or it can be controlled by a motor or solenoid utilizing remote or computer control. An individual knowledgeable in the art of motor or solenoid control could devise numerous ways to control deployment of the light modifying elements 18.

Figure 17:
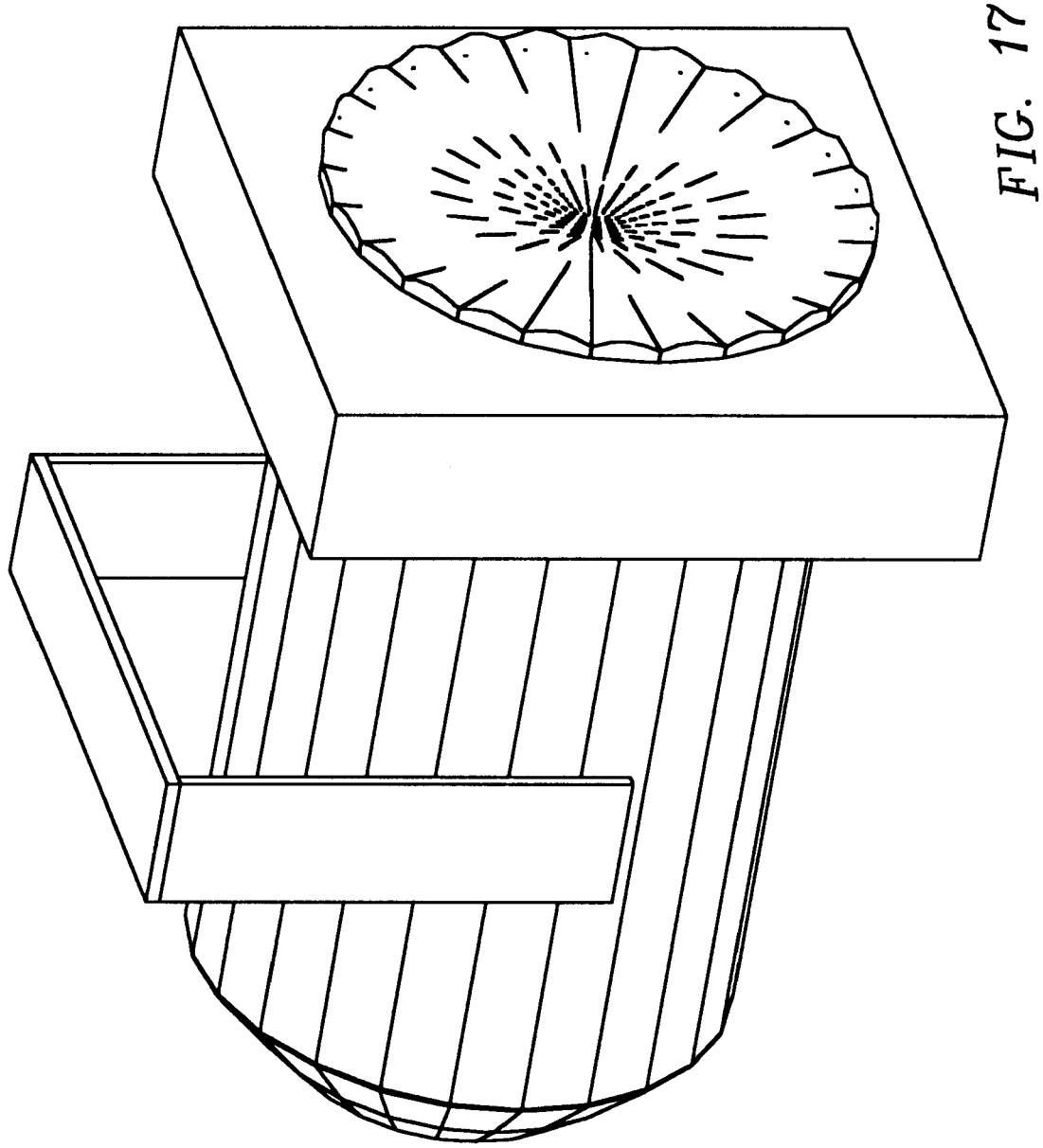
FIG. 17 illustrates a typical lighting module device constructed according to the present invention.
Figure 18:
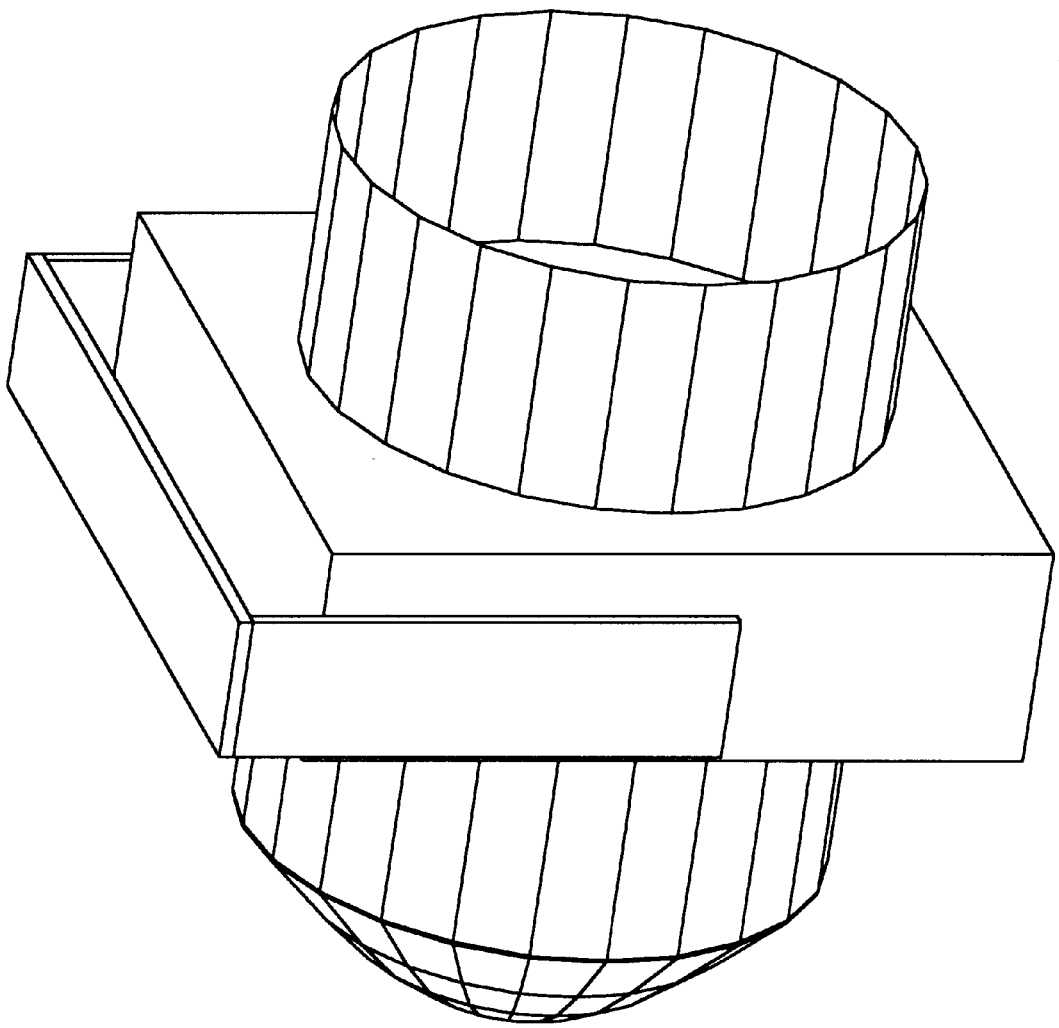
FIG. 18 illustrates another typical lighting module device constructed according to the present invention.

Preferred embodiments of the present invention result in compact, singular units. Two such embodiments are illustrated in FIGS. 17 and 18.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A light beam projection device comprising:
a light source that generates light that travels along an optic path,
a directing optical element that redirects light from said light source along said optic path, said directing optical element that redirects light directs said light at an angle such that said light is not parallel to said optic path,
a primary optical element comprising an array of optic segments to create an area in said optic path where said light from said light source is divided into a plurality of light regions, each said light region is reduced in area after passing through said optic segment, and
a light modifying means comprising at least one light modifying element, each said light modifying element comprises an array of light modifying element segments, said light modifying means is located in said optic path past said primary optic means; wherein
said light modifying means is deployed by moving said light modifying means from a non-deployed position in which said light modifying elements do not impinge said light regions to a deployed position in which said light modifying elements impinge said light regions, and an effect of said light modifying elements is controlled in degree by controlling an amount of impingement of said light modifying elements on said light regions.

2. The light projecting device of claim 1 wherein:
a section of said primary optical element is conical.

3. The light projecting device of claim 1 wherein:
a leading surface of said primary optical element is not planar, but rather is angled rearward from a center point of said primary optical element.

4. The light projecting device of claim 2 wherein:
an angle of said leading surface from vertical is 12°.

5. The light projecting device of claim 1 wherein:
a secondary optical element is installed in said optic path after said filter means to redirect said light so that light projected from said device has a projected direction substantially the same as a projected direction of the light directed at said primary optical element.

6. The light projecting device of claim 5 wherein:
said secondary optical element comprises a plurality of lens segments.

7. The light projecting device of claim 5 wherein:
said secondary optical element comprises an odd-numbered plurality of lens segments.

8. The light projecting device of claim 5 wherein:
a focal length of said primary optical element is not equal to a focal length of said secondary optical element.

9. The light projecting device of claim 5 wherein:
a section of said secondary optical element is conical.

10. The light projecting device of claim 5 wherein:
a trailing surface of said secondary optical element is not planar, but rather is angled forward from a center point of said secondary optical element.

11. The light projecting device of claim 10 wherein:
an angle of said trailing surface from vertical is 12°.

12. A light beam projection device comprising:
a light source that generates light that travels along an optic path,
a primary optical element comprising an array of optic segments to create an area in said optic path where said light from said light source is divided into a plurality of light regions, each said light region is reduced in area after passing through said optic segment,
a light modifying means comprising at least one light modifying element, each said light modifying element comprises an array of light modifying element segments, said light modifying means is located in said optic path past said primary optic means, and
a secondary optical element installed in said optic path after said filter means to redirect said light so that light projected from said device has a projected direction substantially the same as a projected direction of the light directed at said primary optical element; wherein
said light modifying means is deployed by moving said light modifying means from a non-deployed position in which said light modifying elements do not impinge said light regions to a deployed position in which said light modifying elements impinge said light regions, and an effect of said light modifying elements is controlled in degree by controlling an amount of impingement of said light modifying elements on said light regions, and
a focal length of said primary optical element is not equal to a focal length of said secondary optical element.

13. The light projecting device of claim 12 wherein:
said secondary optical element comprises a plurality of lens segments.

14. The light projecting device of claim 12 wherein:
said secondary optical element comprises an odd-numbered plurality of lens segments.

15. The light projecting device of claim 12 wherein:
a focal length of said primary optical element is not equal to a focal length of said secondary optical element.

16. The light projecting device of claim 12 wherein:
a section of at least one of said primary optical element and said secondary optical element is conical.

17. The light projecting device of claim 12 wherein:
a surface of at least one of said primary optical element and said secondary optical element is not planar, but rather is angled from a center point of said optical element.

18. The light projecting device of claim 17 wherein:
an angle of said surface from vertical is 12°.

* * * * *